Sept. 20, 1938.  H. G. RORABAUGH  2,130,472
HAY FORK ATTACHMENT
Filed June 9, 1936
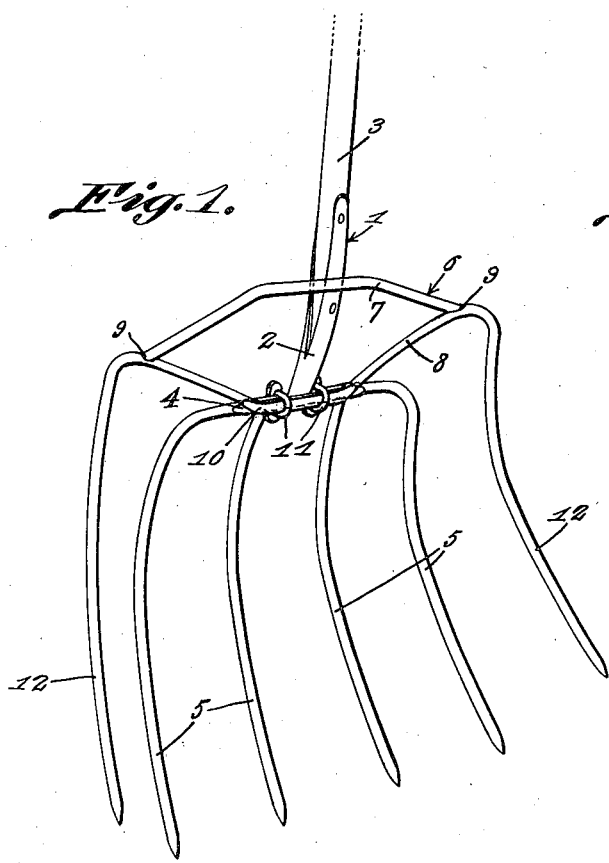
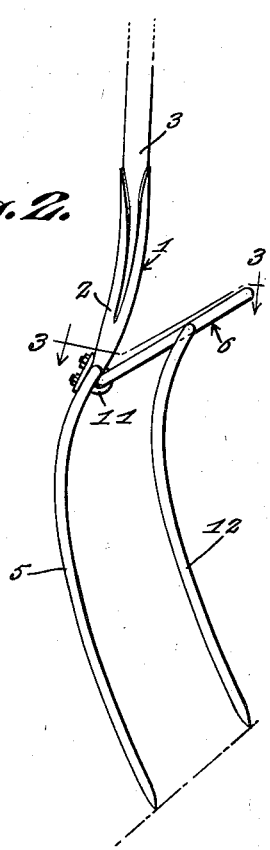
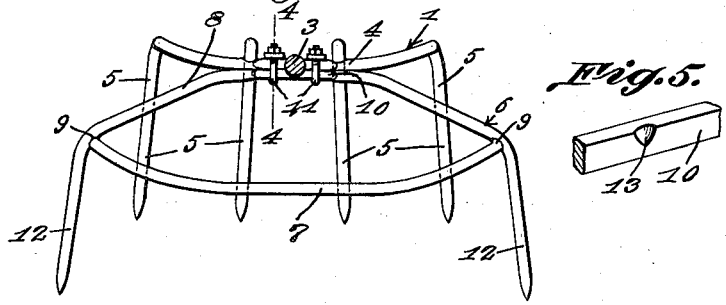
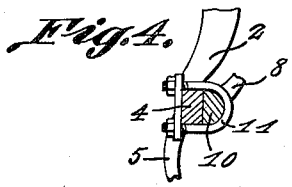
Harold G. Rorabaugh INVENTOR
BY Victor J. Evans & Co.
ATTORNEYS Patented Sept. 20, 1938

2,130,472

UNITED STATES PATENT OFFICE 2,130,472

HAY FORK ATTACHMENT

Harold G. Rorabaugh, Otis, Colo.

Application June 9, 1936, Serial No. 84,343

1 Claim. (Cl. 294—59)

This invention relates to attachments for pitchforks and has for the primary object the provision of a device of this character which may be readily adapted to a conventional type of pitchfork to increase its carrying capacity readily adapting the latter for the handling of straw and the like and which will aid in preventing the straw from falling from the fork.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary perspective view illustrating a conventional type of pitchfork equipped with an attachment constructed in accordance with my invention.

Figure 2 is a fragmentary side elevation illustrating the same.

Figure 3 is a sectional view taken on the line 3—3 of Figure 2.

Figure 4 is a sectional view taken on the line 4—4 of Figure 3.

Figure 5 is a fragmentary perspective view illustrating a notch in the head or frame of the attachment to receive a handle ferrule of the pitchfork.

Referring in detail to the drawing, the numeral 1 indicates a conventional type of pitchfork including a handle ferrule 2 having secured thereto a handle 3 and is formed on the head or bar 4 and the latter has integral therewith the tines 5.

To increase the carrying capacity of a pitchfork of the character described my invention is adapted thereto and consists of a frame 6 including members 7 and 8 integrally connected, as shown at 9. The member 8 has a flattened portion 10 which is positioned against the bar 4 and is detachably secured thereto by U-clamps 11. The member 8 being secured to the bar 4 positions the member 7 outwardly and upwardly with respect to the tines 5. Formed integrally with the ends of the frame 6 are tines 12, the general curvature of which corresponds substantially with the curvature of the tines 5. The tines 12 are positioned outwardly and forwardly of the tines 5 which with the frame 6 increases the carrying capacity of the fork.

The flattened portion 10 of the frame 6 is provided with a notch 13 to receive the ferrule 2 and which aids in preventing the frame 6 from shifting laterally of the fork.

Having described the invention, I claim:

A fork attachment having tines comprising a member embodying a length of material bent intermediate its ends providing a substantially straight central portion adapted to be secured to the head bar of a fork, said tines being spaced from the side tines of the fork with which the attachment is used, the portions of the length of material between the tines and straight portion extending forwardly and being curved upwardly and laterally, an upwardly and forwardly curved bar having its ends connected with the upwardly and laterally curved portions of the attachment, and means for securing the attachment to a fork.

HAROLD G. RORABAUGH.